United States Patent
Perkins et al.

(10) Patent No.: US 11,992,156 B2
(45) Date of Patent: May 28, 2024

(54) AUTOMATED RACK FRYER BASKET LIFT

(71) Applicant: PITCO FRIALATOR, INC., Bow, NH (US)

(72) Inventors: Jared C. Perkins, Chester, NH (US); Steven Savage, Concord, NH (US); Karl M. Searl, Newmarket, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 794 days.

(21) Appl. No.: 17/051,614

(22) PCT Filed: Apr. 30, 2019

(86) PCT No.: PCT/US2019/029924
§ 371 (c)(1),
(2) Date: Oct. 29, 2020

(87) PCT Pub. No.: WO2019/213087
PCT Pub. Date: Nov. 7, 2019

(65) Prior Publication Data
US 2021/0235929 A1 Aug. 5, 2021

Related U.S. Application Data

(60) Provisional application No. 62/665,123, filed on May 1, 2018.

(51) Int. Cl.
*A47J 37/12* (2006.01)
(52) U.S. Cl.
CPC ....... *A47J 37/1219* (2013.01); *A47J 37/1266* (2013.01); *A47J 37/1276* (2013.01); *A47J 37/1295* (2013.01)

(58) Field of Classification Search
CPC .................. A47J 37/1219; A47J 37/1276
See application file for complete search history.

(56) References Cited

U.S. PATENT DOCUMENTS 4,508,026 A * 4/1985 Anetsberger ........ A47J 37/1219
99/336
4,951,558 A * 8/1990 Figliuzzi ............. A47J 37/1219
99/413

(Continued)

FOREIGN PATENT DOCUMENTS

CA          2072589 A1 *  6/1991
KR    20120111642 A  * 10/2012
KR       101268216 B1 *  5/2013

*Primary Examiner* — John J Norton
*Assistant Examiner* — Franklin Jefferson Wang
(74) *Attorney, Agent, or Firm* — Seyfarth Shaw LLP; Brian Michaelis

(57) ABSTRACT

A system for automating the removal of cooking racks or trays laden with food items. The automatic rack lifting system includes a fryer assembly having a frypot and a liftable traveler assembly with a removable rack carrier or cooking carriage that carries a plurality of removable cooking baskets for food into and out of the cooking medium or oil disposed within the frypot. The system may further include lift arms removably secured to an actuation support structure. The automatic rack lifting system comprises a lift system for automated (e.g. under software program control) or manually controlled automatic lifting of a cooking carriage.

13 Claims, 9 Drawing Sheets

(56) References Cited

U.S. PATENT DOCUMENTS

| | | | |
|---|---|---|---|
| 6,588,325 B1 * | 7/2003 | Savage | A47J 37/1219 99/336 |
| 2011/0011278 A1 * | 1/2011 | Jones | A47J 37/1219 99/406 |
| 2011/0061545 A1 * | 3/2011 | Foster | A47J 36/00 99/407 |

* cited by examiner

AUTOMATED RACK FRYER BASKET LIFT

CROSS-REFERENCE TO RELATED APPLICATION DATA

This application claims the benefit of U.S. Provisional Patent Application No. 62/665,123 filed on May 1, 2018, the disclosure of which is incorporated by reference herein.

FIELD OF TECHNOLOGY

The present application relates to lifts, and in particular to an automated rack fryer basket lift, for example for use with deep fryers.

BACKGROUND

Traditional fryer systems rely on manually lifted baskets or racks that require the operator to remove bulky racks from stationary positions within heated oil in the frypot. When an operator removes the food items from the cooking hot oil, the food within baskets or trays may present a challenge for the operator, due to the weight and distance that the racks may need to be lifted. Accordingly, manual insertion and removal of food items as well as baskets and racks containing food items from deep fryers can take up valuable time and present challenges in a high-volume cooking environment.

If an operator cannot expeditiously remove heavy fryer racks when cooking food items, food may get over-cooked and lead to wasted items and additional cost of operations. Despite timers, alarms and the like providing notifications to an operator that a cooking cycle is complete, operators may take longer than appropriate to get fryer baskets out of the cooking oil.

Additionally, manual basket lifts may require additional cleaning or maintenance. This maintenance typically requires the deep fryer to cease operation for an extended period of time, so the manual lift assembly can be disassembled, and this may interrupt the operation of the business in which the deep fryer is used, such as a restaurant or fast food establishment.

SUMMARY

Embodiments of the present disclosure provide systems for automating the removal of cooking racks or trays laden with food items. According to one embodiment, an automatic rack lifting system may comprise a fryer assembly having a frypot and a liftable traveler assembly with a removable rack that carries food into and out of the cooking medium or oil disposed within the frypot. The system may further include lift arms removably secured to an actuation support structure.

According to the disclosure, the automatic rack lifting system comprises a lift system for automated (e.g. under software program control) lifting of a cooking carriage. The coordinated lift system may have at least one motor adapted to actuate the lift assembly between an up, e.g. non-cooking position, and a down, e.g. cooking, position. A plurality of pistons or shafts are coupled to the motor and driven by gears. Lift arms are removably coupled to respective shafts of the plurality of lift shafts. An actuation support structure has at least one actuation track adapted to allow the lift arms to move along the actuation support structure. A traveler assembly with a traveler and carrier arms are removably coupled to the lift arms, and the cooking carriage is removably coupled to the carrier arms. The automatic rack lifting system also has a safety mechanism that ensures safe control of the system during actuation of the lift system and cooking carriage. The deep fryer with the disclosed automatic rack lifting system removes challenges associated with manually lifting a heavy rack system by operators of deep fryers during the preparation of food products in deep fryers. The automatic rack lifting system may also provide quick and simple interchangeable parts to avoid an interruption in operation when the parts need to be cleaned or serviced.

Other features and advantages of the present disclosure will become more apparent to those skilled in the art from the following description of detailed embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which.

DETAILED DESCRIPTION

Figure 1:
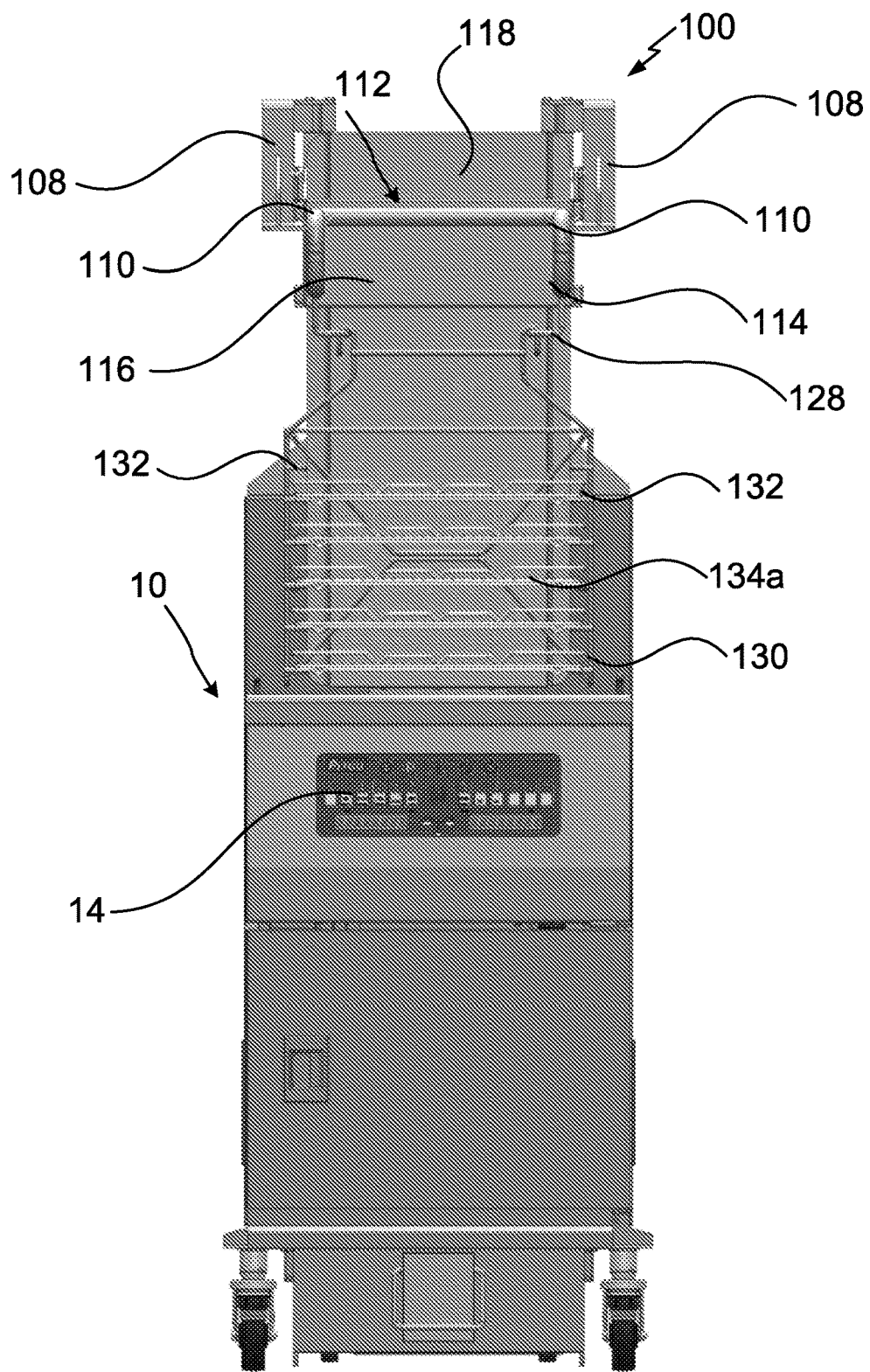
FIG. 1 is a front view illustrating a deep fryer system with an automatic rack lifting system in an up position according to an embodiment of the disclosure.

The present disclosure provides a controlled cooking system with an automatic rack lifting system providing automatic (i.e., software controlled) lifting for an operator of the controlled cooking system. In one exemplary use, the controlled cooking system, such as a deep fryer system, with an automatic rack lifting system provides expeditious and manual labor-free lifting of substantial food loads during actuation of the automatic rack lifting system. A plurality of types of racks may be lifted. The automatic rack lifting system provides quick and simple interchangeable parts to avoid an interruption in operation when the parts need to be cleaned or serviced.

FIGS. 1-4 illustrate a deep fryer 10 that includes an automatic rack lifting system 100 that can be used to automatically carry food into and out of the cooking medium or oil disposed within a frypot 12 of the deep fryer 10. While a single vat 12 is shown, the deep fryer system 10 may also have a plurality of vats 12. In addition, the deep fryer system 10 may have a control panel 14 with electrical/electronic control components disposed on a front side 10a of the deep fryer 10.

Figure 2:
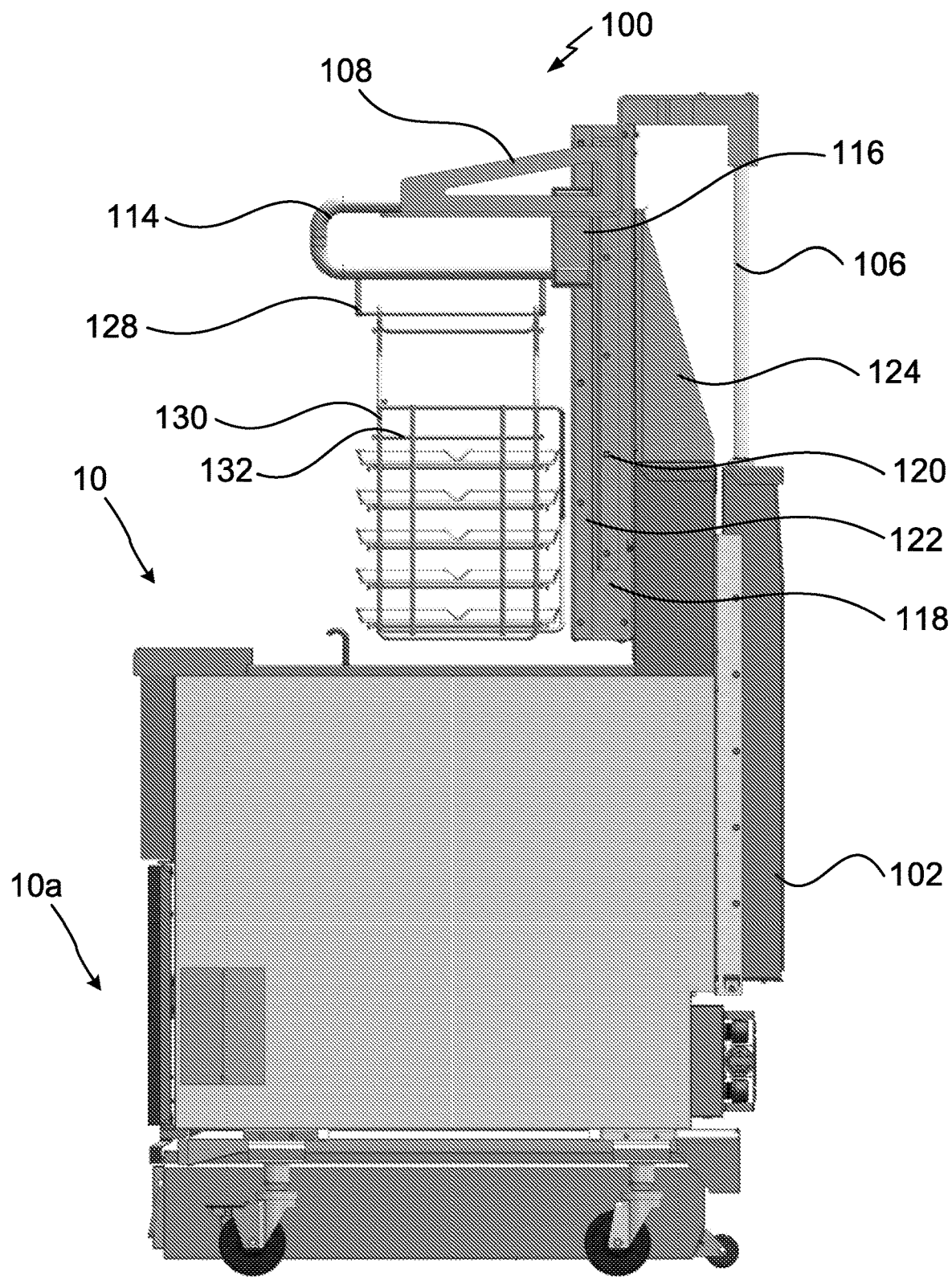
FIG. 2 is a side view illustrating the deep fryer system of FIG. 1 with an automatic rack lifting system in the up position according to an embodiment of the disclosure.
Figure 3:
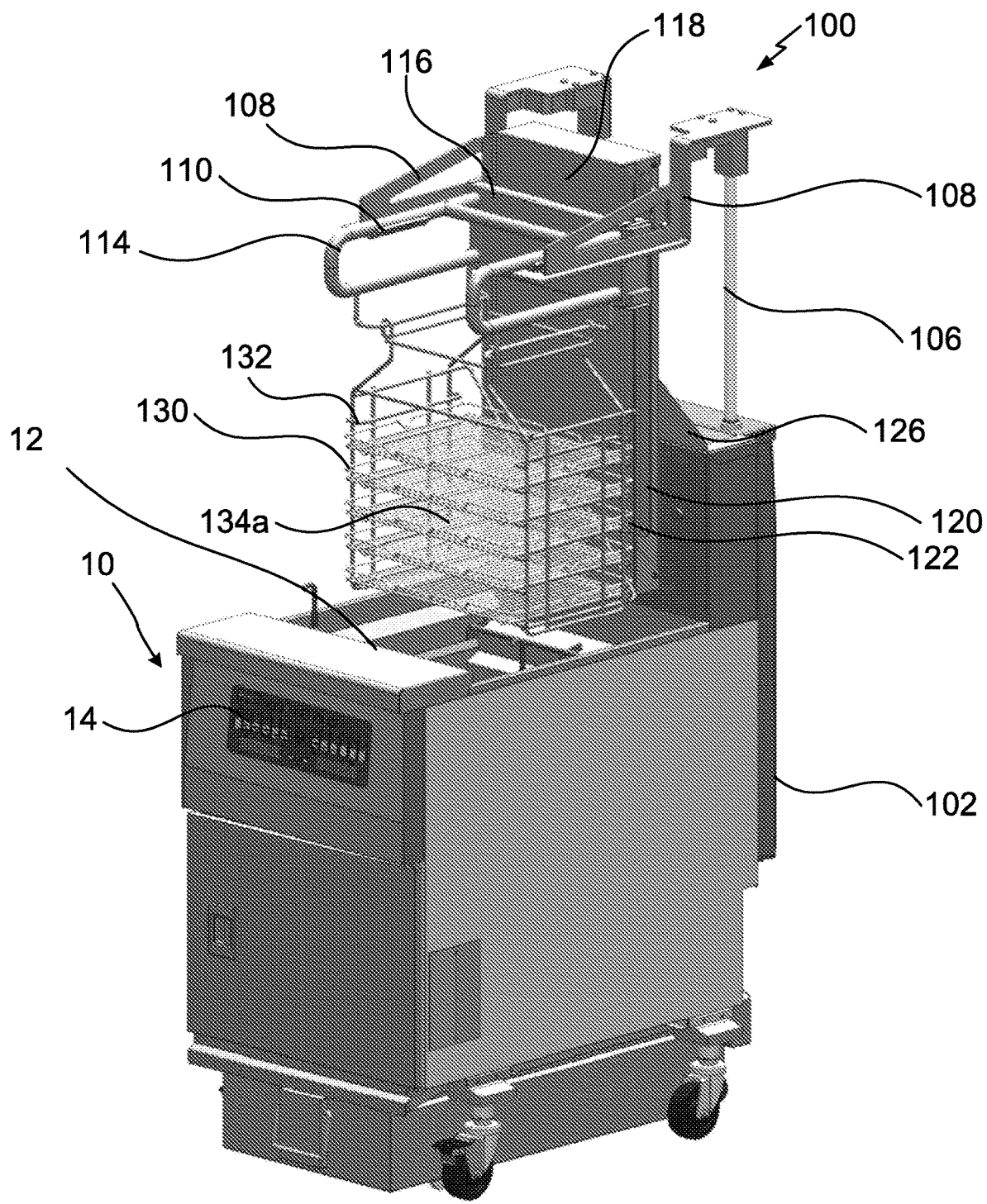
FIG. 3 is a front perspective view illustrating the deep fryer system of FIG. 1 with an automatic rack lifting system in the up position according to an embodiment of the disclosure.
Figure 4:
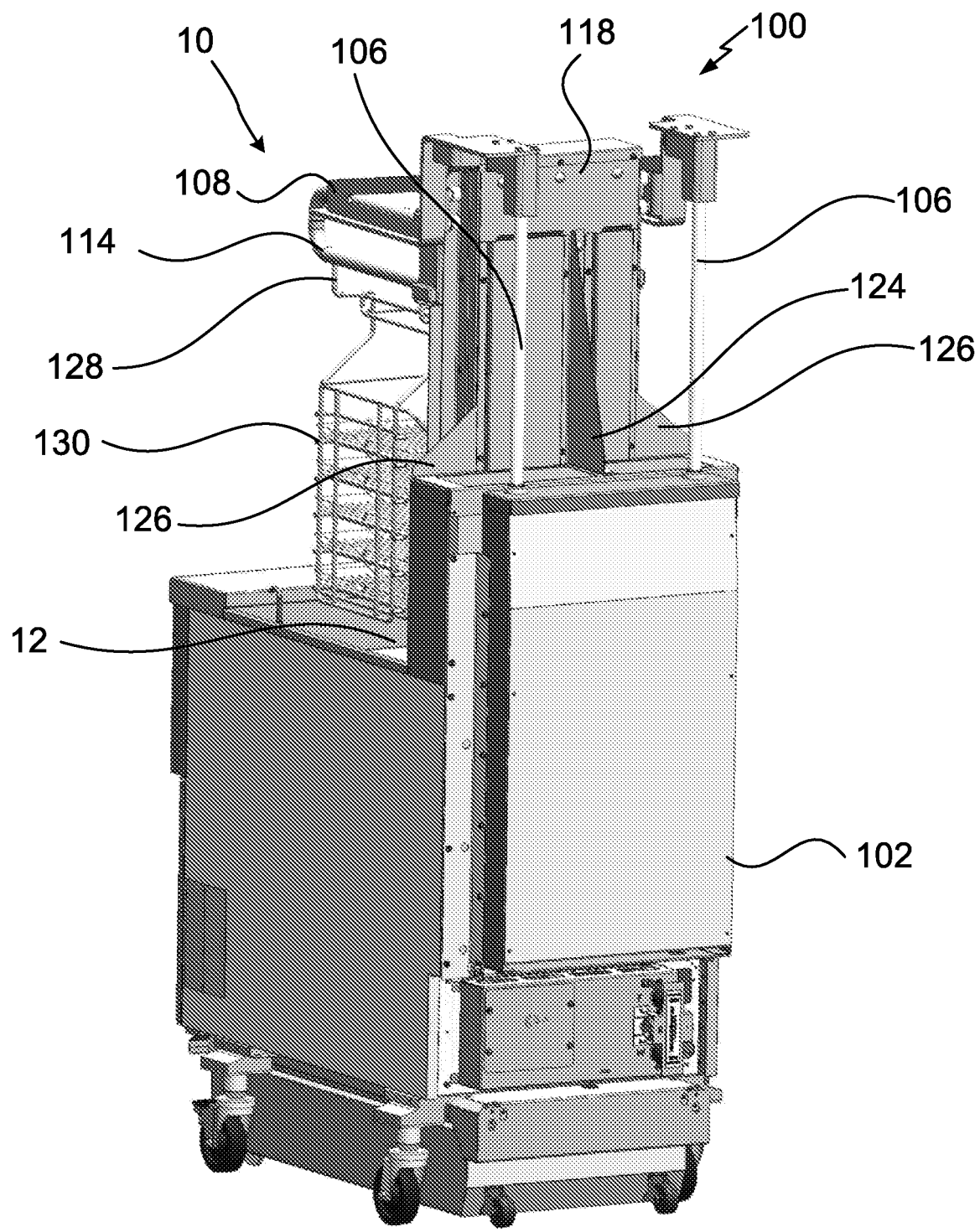
FIG. 4 is a back perspective view illustrating the deep fryer system of FIG. 1 with an automatic rack lifting system in the up position according to an embodiment of the disclosure.

The automatic rack lifting system 100 includes a motor box 102 with at least one motor driven actuator 104 (shown in detail in FIG. 7), adapted to drive the automatic rack lifting system 100. The motor box 102 may be coupled to a rear portion of the fryer, i.e. back side, 10b that is distal to the first side 10a, as illustrated in FIGS. 2-4. The motor driven actuator 104 may be a worm gear linear actuator or any of various other devices capable of driving the automatic rack lifting system 100, such as a pneumatic or hydraulic linear motion device.

Figure 5:
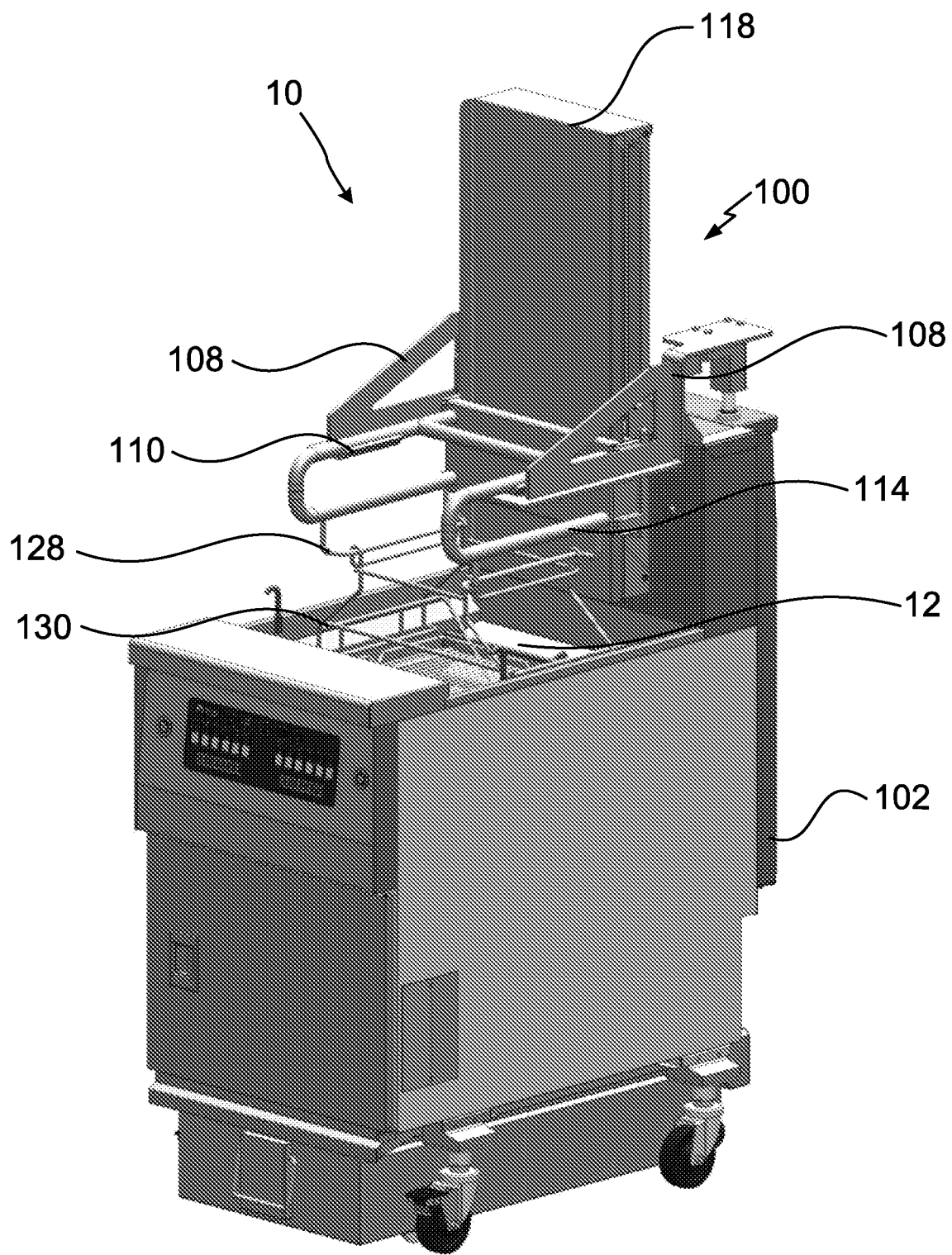
FIG. 5 is a front perspective view illustrating the deep fryer system of FIG. 1 with the automatic rack lifting system in a down position according to an embodiment of the disclosure.

The motor driven actuator 104 is coupled to at least one piston 106 at a first end of the piston. In this embodiment two pistons are implemented in a configuration, that can automatically lift a load of appropriate weight. It should be appreciated that greater or fewer actuators and/or actuators of a different type may be implemented according to the disclosure to lift more or less weight. Each piston or shaft 106 extends in a substantially upward direction from the motor driven actuator 104 and removably couples to a lift arm 108 at a second end of the piston 106 that is distal to the first end to allow the lift arms 108 to be interchangeable for cleaning and reduce downtime for the deep fryer when parts need to be cleaned or serviced. The pistons 106 may be adapted to move in a substantially linear upward and downward fashion to actuate the automatic rack lifting system 100 between an up, e.g. non-cooking position (as shown in FIGS. 1-4) and a down, e.g. cooking, positon (best seen in FIG. 5). While in the up position, the automatic rack lifting system 100 exposes one of more racks 130 that are removably attached to the rack lifting system 100 and are configured to hold food for cooking, as described in greater detail hereinafter.

Each lift arm 108 may extend from the pistons 106 in a direction from the distal side 10b towards the front side 10a of the deep fryer 10 to allow the automatic rack lifting system 100 to create rack space for disposing the racks for food that is moved in and out of the vat 12. The lift arms 108 may each include a cupped carrier or u-shaped projection 110, that are adapted to receive a carrier assembly 112 and more specifically, carrier arms 114 of the carrier assembly 112. The carrier arms 114 may rest on or within the cupped carrier projections 110, so that the carrier assembly can be easily disengaged from the lift arms 108. The carrier arms 114 may be made of hollow tubing to be light weight and allow the carrier assembly 112 to be easily removed and/or interchangeable, without tools, when the carrier assembly 112 needs to be cleaned or serviced.

The carrier assembly 112 may also have a traveler 116 adapted to travel along an actuation support structure 118 of the automatic rack lifting system 100. The actuation support structure 118 may provide structural stability to the automatic rack lifting system 100 to ensure the system actuates properly and with minimal vibration and/or lateral movement. The actuation support structure 118 may be a rigid box that is coupled together using welding, fasteners, adhesives, or the like. In addition, the actuation support structure 118 may have a first actuation track 120 and a second actuation track 122 to allow the lift arms 106 and the traveler 116 to respectively travel along the support structure 118. Further, the actuation tracks 120, 122 allow the automatic rack lifting system 100 to maintain smooth movement and substantially vertical orientation of the automatic rack lifting system 100 during actuation. Each side, e.g. the left side and right side, of the actuation support structure may have respective, i.e., first and second, actuation tracks 120, 122. The actuation tracks may be smooth, finished metal, or they may be lined with a bearing surface or friction limiting material.

In addition, the actuation support structure 118 may have a back support gusset 124 (best seen in FIG. 4), adapted to provide additional structural support to the support structure 118. The back support gusset 124 may be formed on a distal, e.g., back, side of the actuation support structure 118. The actuation support structure 118 may also have side support gussets 126 adapted to provide additional structural support to the support structure 118. The side support gussets 126 may be formed on the side portions, i.e., left and right sides, of the support structure 118.

The carrier arms 114 may also have a rack hanger 128 extending from a bottom portion of the carrier arms 114. The cooking rack 130, which is configured to hold a plurality of removable cooking baskets (described herein with respect to FIGS. 6A-6C), may be removably coupled to the rack hanger 128 to allow for easy cleaning and reduced downtime of the deep fryer 10 during cleaning or service of parts using interchangeable parts that do not require tools. It should be appreciated that the cooking rack 130, in an alternative embodiment, may be fixed to the carrier arms without departing from the scope of the present disclosure.

Figure 6A:
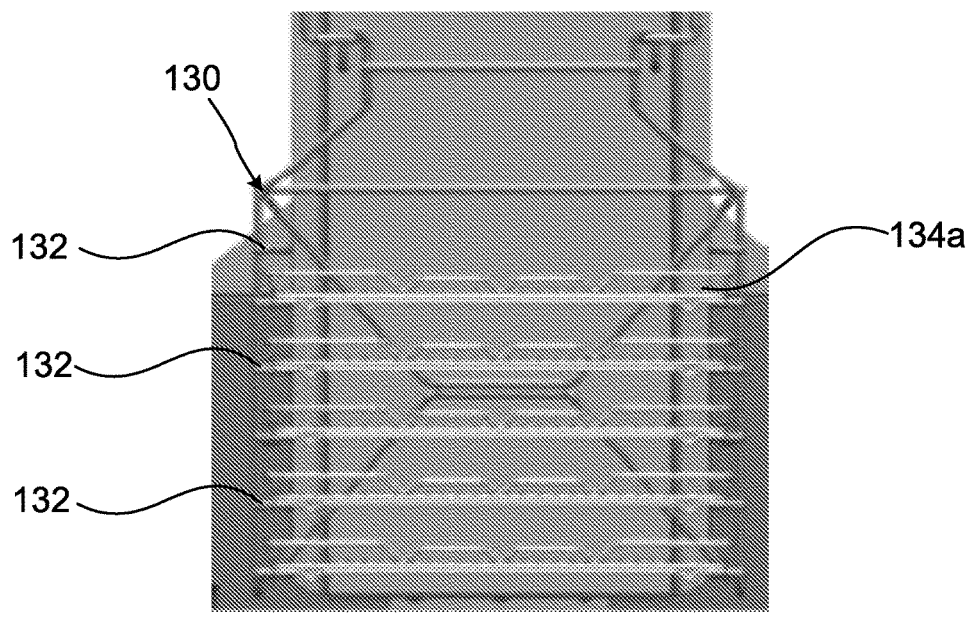
FIGS. 6A-6C are views illustrating exemplary baskets to be used with the automatic rack lifting system according to an embodiment of the disclosure
Figures 6B, 6C:
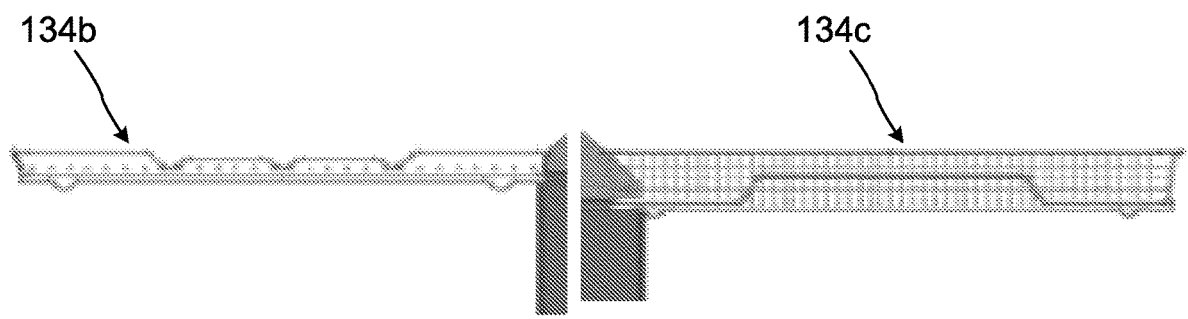

The cooking rack 130 has a plurality of fixed cooking basket rails 132. In FIGS. 1-4, six cooking basket rails are illustrated on each side of the cooking rack 130, that may be adapted to receive one or more of a plurality of removable cooking baskets 134a-134c, illustrated in FIGS. 6A-6C. As illustrated, each side of the cooking rack 130 has rails, with a rail on each side of the rack 130 corresponding and being configured in parallel to hold a respective cooking basket substantially level on the corresponding rails. The cooking baskets 134a-134c are disposed on the cooking basket rails 132, and hold food to be cooked in the vat 12 of the deep fryer 10. As illustrated, a top set of parallel rails 132 may be left empty, with the remaining 5 sets of rails carrying respective cooking baskets. As illustrated, shallow cooking baskets (e.g., 134a-134c as illustrated in FIGS. 6A-6C), are disposed on each of the rails on the rack. However, it should be appreciated that deeper cooking baskets may be disposed, for example on alternating rails of the rack, in order to cook different kinds of food in different basket form factors. The cooking baskets 134a-134c may be disposed on the cooking basket rails 132 and held in place by the weight of the food placed in/on the baskets. However, it should also be appreciated that mechanical mechanisms such as tangs, clasps, clips, other fasteners/hardware or the like, or friction fitting of the baskets relative to the rails and rack may be used to maintain the racks in place on the rack.

When the automatic rack lifting system 100 is in the up position, the cooking rack 130 may be disposed above the vat 12, which allows an operator of the deep fryer to load food in removable cooking baskets onto the cooking rack 130 in preparation to cook the food. When the automatic rack lifting system 100 is in the down position, the cooking rack with food in baskets will be disposed within the vat 12. The height of the rails on the rack and space between baskets may be adapted to hold and ensure the food does not move from the baskets in the cooking rack 130 during the cooking of the food product in the vat 12. The cooking rack 130 may be any of various shapes or sizes or dimensions to allow for different food products to be loaded into different baskets disposed onto the cooking rack and cooked within the deep fryer vat.

Figure 7:
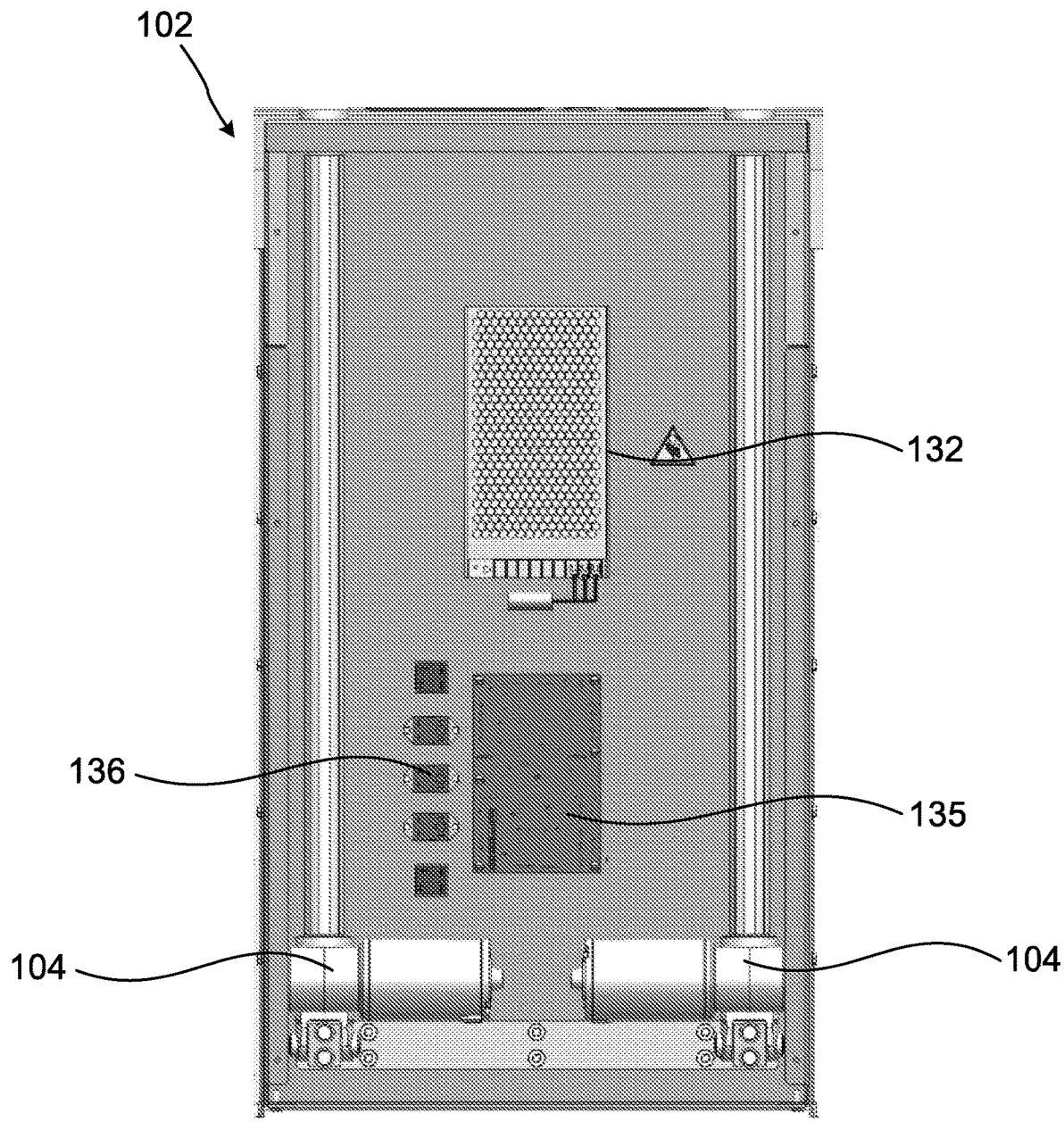
FIG. 7 is a detailed view illustrating a motor box for an automatic rack lifting system for a deep fryer system according to an embodiment of the disclosure.

The motor box 102 may be coupled to a rear portion of the fryer, i.e. back side, of the automatic rack lifting system 100. As shown in FIG. 7, the motor box (shown with its cover off), may house the motor driven actuators 104 as well as a power supply 132, a driver board 135, and a safety mechanism 136. The power supply 132 may be adapted to receive power from a power source, and to supply the received power to the driver board 135 to control the motor driven actuators 104 that drive the actuation of the automatic rack lifting system 100. The power supply 132 may also supply power to the driver board 135 to control the safety mechanism 136. The safety mechanism 136 may be an analog circuit, a printed circuit board, or the like to allow the safety mechanism to ensure proper operation of the rack lifting system 100, and shut the automatic rack lifting system 100 down under conditions that may be monitored by the driver board 135 or other control electronics.

Figure 8:
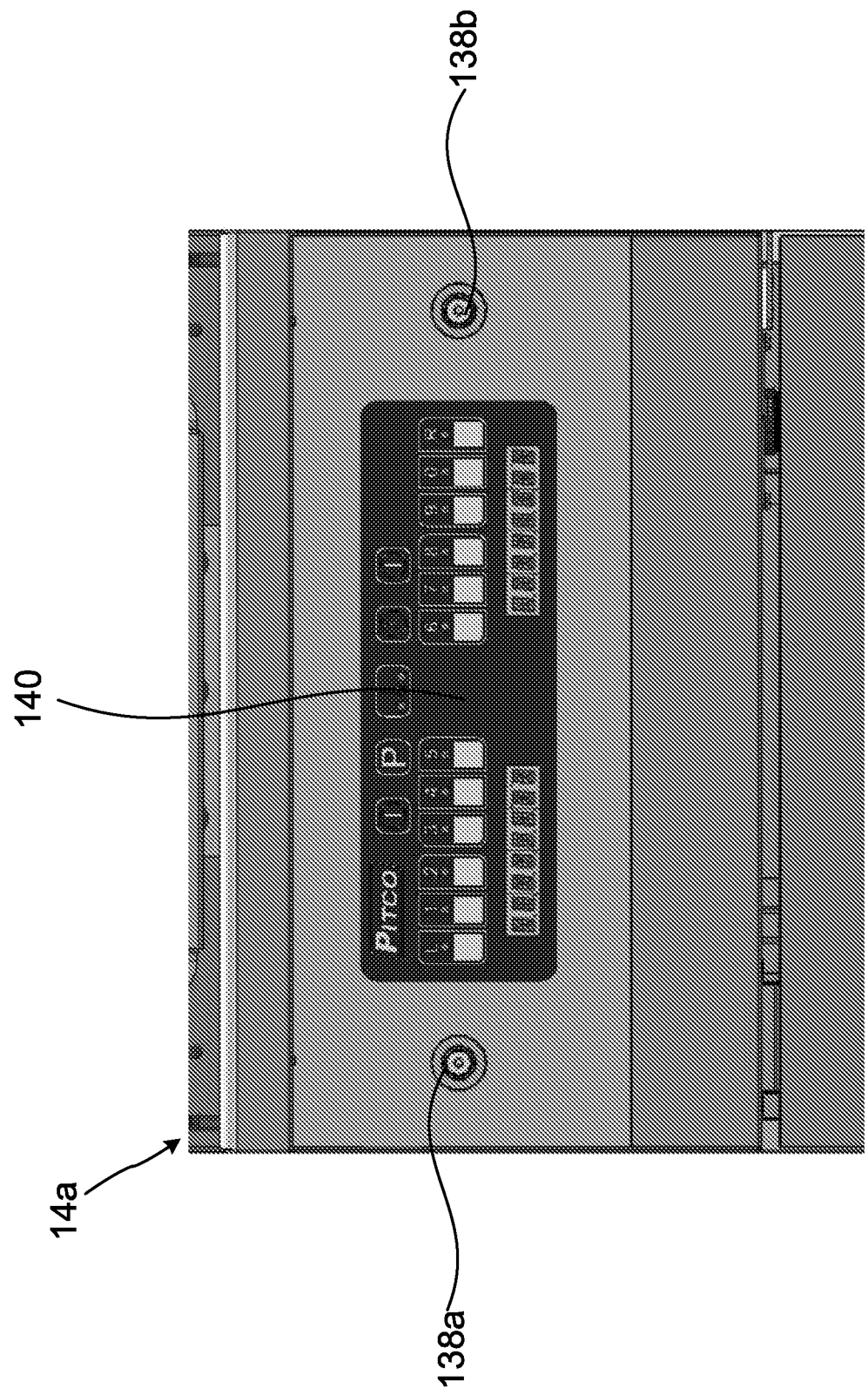
FIG. 8 is a detailed view illustrating a control panel for an automatic rack lifting system for a deep fryer system according to an embodiment of the disclosure.

According to an embodiment of the present disclosure, a control panel 14a, as shown in FIG. 8, may have two lift system control components 138a, 138b adapted for a user/operator to control actuation of the rack lifting system 100 between the up position and the down position, in addition to other programmable operator controls 140 (which are used to program operation of the deep fryer for operation under software control). The lift system control components 138a, 138b may be positioned such that an operator of the deep fryer 10 is positioned to be clear of the actuation of the rack lifting system 100 and is required to use both hands to manually operate an operator controlled (i.e. not under total program control) lift operation of the lift system. The lift system control components 138a, 138b may be any of various types of manual controls, such as buttons, momentary switches, toggle switches, or the like, to manually control actuation of the rack lifting system 100. The lift system control components 138a, 138b, coupled with other control inputs to the driver board 135 (such as a cooking input indicating the fryer is in cooking mode), may allow actuation of the rack lifting system 100 only when specific conditions are met.

In accordance with the present disclosure, the rack lifting system 100 may only actuate to a down position when particular conditions of the lift system control components 138a and 138b, are met. That is, for example, the rack lifting system 100 may only actuate the cooking rack 130 (with or without baskets 134), to a down position when the left-hand-side lift system control component 138a and both the left-hand-side lift system control component 138a and the right-hand-side lift system control component 138b, are activated. This condition would result when the operator is using both hands to depress or activate the lift system control components 138a and 138b. The lift system control components 138a and 138b may be combined with a cooking input control signal to the driver board 135 indicating the fryer is in cooking mode, such that when the cooking input control signal is present and the lift system control components 138a and 138b are properly actuated, the cooking rack will be actuated to the down position.

That is, the cooking input indicating the fryer is in cooking mode may be viewed as a lift system control component along with the lift system control components 138a and 138b. If any of the lift system control components, cooking input and 138a and 138b, are deactivated for a selectable amount of time (e.g., 2 seconds), the lift system and the cooking rack 130 will automatically actuate to the up position. It should be appreciated that a single lift system control component, or at least one (e.g. in a particular sequence), may be required to be activated in order to verify a safe operator scenario for the cooking rack to be manually operated to the down position.

Figure 9:
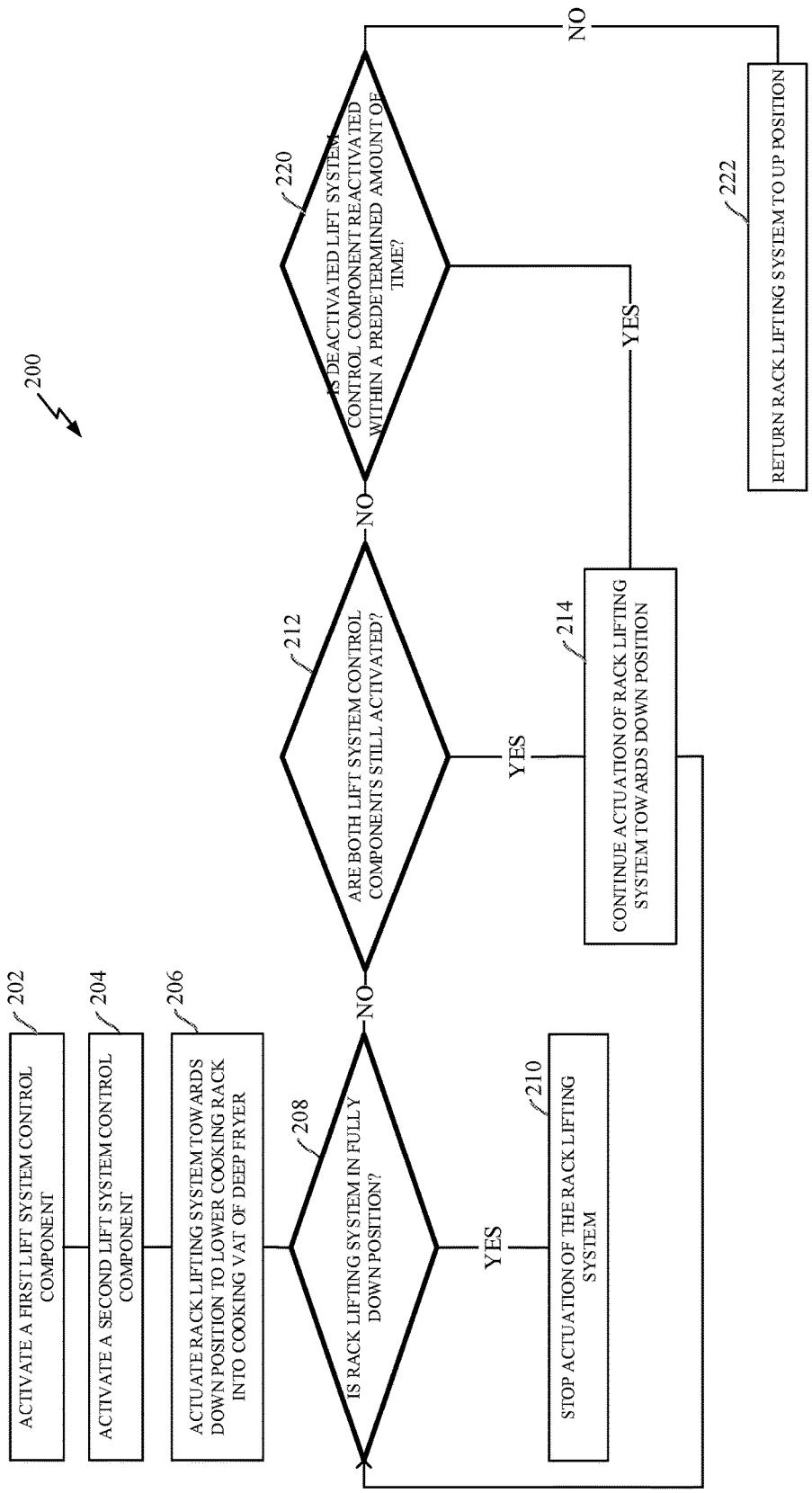
FIG. 9 is a flow diagram illustrating a method of operation for a safety mechanism for a deep fryer system with an automatic rack lifting system according to an embodiment of the disclosure.

FIG. 9 illustrates an exemplary flow diagram of an overview of a method 200 of operation for a safety mechanism for a deep fryer system with an automatic rack lifting system according to an embodiment of the disclosure. The method 200 includes activating a first lift system control component (for example the cooking input and/or lift control component 138a), at block 202 and activating a second lift system control component, for example lift control component 138a, at block 204. When both the first and second lift system control components are activated, the rack lift system begins to actuate towards the down position, where a cooking rack is disposed within a cooking vat for the deep fryer 206. While the rack lift system actuates towards the down position, the safety mechanism determines whether the rack lift system has reached the down position at block 208. When it is determined the rack lift system reaches the down position, the safety mechanism stops actuating the rack lift system at block 210.

When it is determined the rack lifting system is not in the fully down position, the safety mechanism determines whether the first and second lift system control components (e.g. the cooking input indicating the fryer is in cooking mode and one or both of 138a, 138b), are still activated at block 212. If/when they are still activated the actuation of the cooking rack towards the down position continues, at block 214. With both control components still activated, the safety mechanism continues to check whether the rack lift system has reached the fully down position until the rack lift system reaches the fully down position, as described above.

When the safety mechanism determines that one of the lift control components becomes deactivated (at step 121, "No"), for example the lift control component 138a is no longer activated, the safety mechanism may pause downward actuation of the carrier and then determines whether the deactivated lift system control component is reactivated within a predetermined amount of time, for example about 2 seconds, at block 220. The predetermined amount of time may be used to indicate the lift control component was not purposefully deactivated and allow actuation of the rack lifting system to be continued (without the actuation of the carrier having changed to the upward position). When the deactivated lift control component(s) is/are reactivated within the predetermined amount of time, the safety mechanism may cause the rack lift system to continue actuation towards the down position. However, if the deactivated lift system control component(s) is/are not reactivated within the predetermined amount of time, then the safety mechanism may return the rack lifting system back to the up position, at block 222.

It should be appreciated that although a safety mechanism is described that requires two hands in operation on respective momentary switches, other safety mechanisms may be implemented in the context of the automated rack lifting mechanism according to the invention, and sequence of activation may be considered for purposes of safe manual actuation. For example, a sequence requiring first presence of a cooking input indicating the fryer is in cooking mode, then requiring actuation of one or both (in a particular order) of the manual actuation control components 138a, 138b, may be implemented according to the disclosure to effect safety controlled manual (or semi-automatic) downward operation of the rack lifting system.

While a two second predetermined deactivation of one of the control components is described, it should be appreciated that other time periods may be used for the predetermined period. Further, it should be appreciated that rather than a time period that controls whether actuation is activated or reactivated by the control components, one skilled in the art should appreciate that a sequence of activation or deactivation of control components 138a and/or 138b may cause the lift system to stop or continue downward or upward actuation. Lift control components 138a and 138b may be combined as a single control component used in combination with the cooking input indicating the fryer is in cooking mode or with other signal-based control components (e.g. oil temperature control component, safety sensor control components or the like).

It should be appreciated that references to items in the singular should be understood to include items in the plural, and vice versa, and although enumerated items have been described herein (e.g. two control components, six rack rails, a rack carrier, it should be appreciated that other numbers of such items may be implemented in a system according to the disclosure. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

While various embodiments are disclosed herein, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. An automatic rack lifting system for a deep fryer, the rack lifting system comprising:
   a motor box with at least one motor driver actuator adapted to actuate the rack lifting system between an up position and a down position;
   a first piston and a second piston, the at least one motor driver actuator coupled to a first end of the first piston and a first end of the second piston;
   a first lift arm removably coupled to a second end of the first piston and a second lift arm removably coupled to a second end of the second piston, wherein the first and second lift arms extend horizontally towards a first end of the deep fryer;
      the first lift arm and the second lift arm each including a u-shaped projection;
      a carrier assembly including a first carrier arm removably coupled to the u-shaped projection of the first lift arm and a second carrier arm removably coupled to the u-shaped projection of the second lift arm, and a traveler coupled to the first carrier arm and the second carrier arm;
   an actuation support structure removably coupled to the deep fryer, the actuation support structure including a first track and a second track for maintaining a vertical orientation of the automatic rack lifting system during actuation;
      the traveler adapted to travel along the actuation support structure during actuation; and
   a cooking rack removably coupled to the carrier assembly.

2. The automatic rack lifting system of claim 1, wherein the traveler moves along the first track and the second track of the actuation support structure during the actuation of the rack lifting system.

3. The automatic rack lifting system of claim 1, further comprising a back support gusset coupled to the actuation support structure, the back support gusset adapted to provide additional structural support to the rack lifting system.

4. The automatic rack lifting system of claim 3, further comprising at least one side support gusset coupled to a side portion of the actuation support structure, the side support gusset adapted to support the actuation support structure.

5. The automatic rack lifting system of claim 1, wherein the actuation support structure is a rigid box made of a rigid material fastened together.

6. The automatic rack lifting system of claim 1, wherein the cooking rack receives cooking baskets that are interchangeable based on a food to be cooked by the deep fryer.

7. The automatic rack lifting system of claim 1, wherein the first track of the actuation support structure is disposed on a first side of the actuation support structure and the second track of the actuation support structure is disposed on a second side of the actuation support structure.

8. An automatic rack lifting system for a deep fryer, the rack lifting system comprising:
   a motor box with at least one motor driver actuator adapted to actuate the rack lifting system between an up position and a down position, a power supply adapted to power the rack lifting system, and a safety mechanism for the actuation of the rack lifting system;
   a first piston and a second piston, the at least one motor driver actuator coupled to a first end of the first piston and a first end of the second piston;
   a first lift arm removably coupled to a second end of the first piston and a second lift arm removably coupled to a second end of the second piston, wherein the first and second lift arms extend horizontally towards a first end of the deep fryer;
      the first lift arm and the second lift arm each including a u-shaped projection;
      a carrier assembly including a first carrier arm removably coupled to the u-shaped projection of the first lift arm and a second carrier arm removably coupled to the u-s ha ped projection of the second lift arm, and a traveler coupled to the first carrier arm and the second carrier arm;
      the traveler adapted to travel along an actuation support structure removably coupled to the deep fryer during actuation; and
   a cooking rack removably coupled to the carrier assembly, and configured to receive a plurality of cooking baskets.

9. The automatic rack lifting system of claim 8, further comprising a control panel coupled to the deep fryer comprising a plurality of lift system control components adapted to control actuation of the automatic rack lifting system and communicably coupled to the safety mechanism.

10. The automatic rack lifting system of claim 9, wherein the plurality of lift system control components is two lift system control components.

11. The automatic rack lifting system of claim 9, wherein the cooking baskets are interchangeable based on a food to be cooked by the deep fryer.

12. The automatic rack lifting system of claim 8, wherein in the up position, the rack lifting system positions the cooking rack above a cooking vat of the deep fryer to allow the rack to be loaded with food products for cooking by the deep fryer.

13. The automatic rack lifting system of claim 12, wherein in the down position, the rack lifting system disposes the cooking rack within the cooking vat of the deep fryer to cook the food products loaded on the cooking rack.

* * * * *